United States Patent [19]

Thomas

[11] 4,028,085
[45] June 7, 1977

[54] METHOD FOR MANUFACTURING SILICATE GLASSES FROM ALKOXIDES

[75] Inventor: Ian M. Thomas, Temperance, Mich.

[73] Assignee: Owens-Illinois, Inc., Toledo, Ohio

[22] Filed: Feb. 3, 1976

[21] Appl. No.: 655,025

[52] U.S. Cl. .............................. 65/134; 65/DIG. 14; 106/52; 106/73.4; 106/73.5; 252/317

[51] Int. Cl.² ........................ C03B 5/16; C03C 3/04

[58] Field of Search ...................... 65/DIG. 14, 134; 106/52, 73.4, 73.5; 252/317

[56] References Cited

UNITED STATES PATENTS

| 3,640,093 | 2/1972  | Levene et al. | 65/134     |
| 3,759,683 | 9/1973  | Dislich et al. | 65/134     |
| 3,799,754 | 3/1974  | Thomas        | 65/134     |
| 3,811,918 | 5/1974  | Levene        | 65/DIG. 14 |
| 3,847,583 | 11/1974 | Dislich et al. | 65/134 X   |

Primary Examiner—S. Leon Bashore
Assistant Examiner—Frank W. Miga

Attorney, Agent, or Firm—Robert F. Rywalski; Edward J. Holler

[57] ABSTRACT

A process is provided for producing carbon-free homogeneous silicate compositions comprising;

combining a hydrolyzable metal alkoxide with a clear solution of a partially hydrolyzed silicon tetraalkoxide so as to form a clear solution of a further hydrolyzable metallosiloxane;

adding an additional quantity of water to said solution in an amount in excess of that required to theoretically hydrolyze residual alkoxy groups of said further hydrolyzable metallosiloxane, thereby forming a substantially hydrolyzed metallosiloxane;

fractionally distilling said substantially hydrolyzed metallosiloxane, i.e. heating under a fractionating column, in the presence of free water for a time sufficient to remove all residual alcohol as distillate and hydrolyze residual alkoxy groups.

4 Claims, No Drawings

METHOD FOR MANUFACTURING SILICATE GLASSES FROM ALKOXIDES

THE INVENTION

The present invention relates to the preparation of silicate compositions and more particularly relates to making such silicate glasses using silicon tetraalkoxides and metal alkoxides as starting materials.

The prior art is well aware of methods for manufacturing silicate glass compositions employing silicon tetraalkoxides and metal alkoxides as starting materials. Exemplary of this art are U.S. Pat. Nos. 3,759,683, 3,640,093, 3,597,252, German Auslegeschrift No. 1,286,038, and Angewandte Chemie, International Edition, Vol. 10, No. 6, June 1971, pages 363–434. In the processes disclosed in the above materials a reaction product of water, a silicon tetraalkoxide and a metal alkoxide is formed and subsequently the reaction product is heated at a temperature and for a time sufficient to form a glass.

Problems exist in the prior art techniques of using alkoxides however in that, upon heating, carbonaceous residues in the form of black specks occur. This obviously is unsatisfactory in applications where extremely high purity and homogeneity is required. While the heating can be effected so as to oxidatively degrade the carbonaceous residues it is extremely difficult, if not virtually impossible, to thermally degrade the carbonaceous residues in the absence of oxygen. For many applications, for example in the communications and information transmittal industries using glass fibers, or rods, ultra-high purity glass is needed and to effect the formation of such glass bodies it is desirable to practice the conventional glass melting under vacuum and/or in a closed system. With either of these techniques oxidative degradation of the carbonaceous residue is not possible and thermal degradation will be ineffective.

Essentially the problem resides in that the reaction product of the water, silicon tetraalkoxides and metal alkoxides, in spite of excess amounts of water, contain traces of unhydrolyzed alkoxide groups which cause the carbonaceous or black speck occurrence upon heating. This is because of the following equilibrium reaction between alkoxy groups and water, —OR + HOH ⇌ —OH + ROH.

Applicant has now discovered an improvement in prior art processes for forming silicate glass compositions of the type wherein a reaction product is formed of water, a silicon tetraalkoxide, and a metal alkoxide and then the metal reaction product heated at a temperature and for a time sufficient to form a glass. The improvement essentially comprises fractionally distilling the reaction product under a fractionating column and in the presence of free water generally for a time sufficient to produce a column-head temperature of about 100°C. By such fractional distillation alkanol by-product and water are removed from the reaction product as the overhead or distillate stream from the fractionating column and the reaction product system which is being fractionally distilled, i.e. distillation residual, becomes progressively more and more concentrated in water. This has the net effect of shifting the equilibrium reaction of alkoxides and water to completion and results in the hydrolysis of all the alkoxy groups, thereby precluding difficulties with the appearance of carbonaceous residues or black specks upon subsequent heating. Thus by incorporating the fractional distillation step subsequent melting can be confidently practiced in closed systems and/or in vacuum melting operations without fear of the occurrence of undesirable black residues.

German Offlengungsschrift No. 1,216,038 discloses the formation of silicate compositions from the reaction product of water, a silicon tetraalkoxide and a metal alkoxide and discloses the splitting off of the alkanol by-product under vacuum. There is no recognition however of the present inventive contribution therein. U.S. Pat. No. 3,870,656 discloses the formation of silica containing compositions from a hydrogel produced from an alkali metal silicate and discloses distillation of a composite comprising silica and an azeotropic mixture of water and an organic compound; this patent, however, has no teachings directed to the problem solved herein.

In accordance with the preferred practice of this invention there is provided a process for producing a carbon or carbonaceous free homogeneous silicate glass composition comprising;

combining a hydrolyzable metal alkoxide with a clear solution of a partially hydrolyzed silicon tetraalkoxide so as to form a clear solution of a further hydrolyzable metallosiloxane;

adding an additional quantity of water to said solution in an amount in excess of that required to theoretically hydrolyze residual alkoxy groups of said further hydrolyzable metallosiloxane, thereby forming a substantially hydrolyzed metallosiloxane;

fractionally distilling said substantially hydrolyzed metallosiloxane in the presence of free water for a time sufficient to remove all residual alcohol and hydrolyze residual alkoxy groups. As previously indicated the fractional distillation, employing a conventional fractionating column allows the product or residue from the fractional distillation to then be heated and melted to a silicate glass without fear of the formation of black residues.

In a more specific preferred embodiment of the present invention the reactant system, after the addition of the additional quantity of water to form a clear solution of a substantially hydrolyzed metallosiloxane, will be allowed to form a gel, which gel in effect includes the substantially hydrolyzed metallosiloxane, alkanol by-product and water; then, the gel will be concentrated, and can for example be taken to dryness, and the concentrated gel combined with an additional quantity of water and fractional distillation then effected.

The process indicated above may be employed to produce numerous varieties of glass compositions with aluminosilicate compositions, aluminoborosilicate compositions, alkaline earth and/or alkaline oxide aluminosilicate compositions, and alkaline earth or alkaline oxide aluminoborosilicate compositions being exemplary.

The present inventive contribution is ideally suited for incorporation in the process described in U.S. Pat. No. 3,640,093 wherein alkoxides are employed to form a silicate glass composition, which patent is hereby incorporated by reference. In passing however it should be mentioned that especially in the case of producing ultra-high purity products it is preferred that the glass forming constituents be added in the form of hydrolyzable volatile alkoxides and where such alkoxides do not exist, such as for example in the case of the alkali metals or alkaline earth metals, that the glass forming constituents be added in the form of ultra-high purity oxides of hydroxides. The metal alkoxides contemplated herein may be represented by the formula $M(OR)_x$ wherein $x$ is an integer which corresponds to the valence of M and M is a metal which includes not only the traditional metals but the so-called metal-like elements, for example the metalloids. R is an alkyl group of 1 to 6 carbon atoms. Desirably the metal alkoxide will be a volatile alkoxide which is easily purified by distillation and exemplary of these metal alkoxides are alkoxides of Al, Ti, Ge, Zr, Hf, Th, V, and Nb, Ta, B, Sn. Included in the term metal alkoxides are also the so-called double alkoxides which are generally represented by the formula $CaAl_2(OR)_8$ and $MgAl_2(OR)_8$. Of course as will be apparent a plurality of metal alkoxides may be employed. The silicon tetraalkoxides contemplated herein are those of the formula $Si(OR)_4$. R is an alkyl group of 1–6 carbon atoms with the preferred silicon alkoxide being silicon tetraethoxide.

The clear solution, that is the solution which appears clear to the unaided eye, of a partially hydrolyzed silicon tetraalkoxide may be prepared by hydrolyzing the silicon tetraalkoxide in the presence of an effective amount of an acid hydrolysis catalysts, preferably HCl or nitric acid and in the presence of a $C_1$–$C_5$ alkyl alcohol solvent, preferably ethanol, with less than a stoichiometric amount of water; preferably between about 0.3 to about 1.5 moles of water per mole of silicon tetraalkoxide will be employed. Another method for forming such solution is to hydrolyze silicon tetraalkoxide with an excess of a stoichiometric amount of water, that is an excess of 2 moles of water per mole of silicon tetraalkoxide and then to add additional silicon tetraalkoxide thereto so that the effective ratio of the total water employed for the hydrolysis to the total silicon alkoxide is less than stoichiometric and preferably in the range previously indicated. The latter method for hydrolysis is described in U.S. Pat. No. 2,524,358.

Next the hydrolyzable metal alkoxide is added to the above produced clear appearing solution to form another solution, containing a hydrolyzable metallosiloxane, which solution is likewise clear by visual observation. The formation of this clear appearing solution of the further hydrolyzable metallosiloxane provides for an extremely homogeneous composition. Subsequently there is then added to the clear solution of the further hydrolyzable metallosiloxane an additional quantity of water. This quantity of water is in excess of that theoretically required to hydrolyze residual alkoxy groups of the further hydrolyzable metallosiloxane. The amount of water needed for theoretical hydrolysis will be 2 moles of water per mole of silicon alkoxide less the number of moles of water employed in producing the partially hydrolyzed tetraalkoxide plus the amount of water theoretically required to hydrolyze the metal alkoxide which has been added. If for example aluminum alkoxide is added the number of moles needed to theoretically hydrolyze that alkoxide will be 1.5 moles of water per mole of alkoxide or, more generically, the moles of water needed for the metal alkoxide will be $X/2$ moles of water per mole of metal alkoxide wherein X is as indicated above. Preferably however the amount of water added will be such that the total amount of water employed in the processing will be at least 50% and quite suitably around 100% in excess of the theoretical amount. The reaction product of the water, metal alkoxide with the hydrolyzed silicon tetraalkoxide after addition of the former is referred to herein as a substantially hydrolyzed metallosiloxane because in spite of the addition of excess water residual hydrolyzable alkoxide groups are present which are hydrolyzable but some of which, as indicated previously, are apparently very difficult to hydrolyze.

The solution produced above after the additional quantity of water may then be fractionally distilled with a conventional fractionating column until a fractionating column-head temperature of 100°C. is reached, whereby the residual alkoxy groups are hydrolyzed and all residual alkanol is removed, hence producing a silicate product with no residual alkoxy groups and one which can be confidently heated without any dangers of the formation of carbonaceous residues. An excess of the theoretical amount of water is employed to ensure that free water is present and this water along with the individual alkanol by-products and alkanol solvent, if that is employed, form a composition such that upon fractional distillation the overhead, or distillate, which is taken off is alkanol or an azeotrope of alkanol and water and that the distillation pot residue during fractional distillation becomes progressively more concentrated and rich in water.

Alternatively, instead of fractionally distilling after the additional quantity of water has been added to form the solution of the substantially hydrolyzed metallosiloxane, the system may be allowed to form a gel and the gel then concentrated, even to dryness, by heating in any conventional manner to effect the removal of at least some of the alkanol present. While the degree of concentration is not critical it will generally be convenient to concentrate sufficiently to form a product which is, for example, about fifty to about several-hundred percent overweight relative to the theoretical oxide composition. Desirably the concentrated gel will then be combined with an additional quantity of water, which amount in not critical, and fractional distillation effected. This additional quantity of water further serves during fractional distillation to drive the equilibrium reaction of residual alkoxide groups plus water to completion.

While the foregoing describes the present invention with sufficient particularity to enable those skilled in the art to make and use same there nonetheless follows an exemplary embodiment of the present invention. In this example an ultra-high purity soda-aluminoborosilicate glass was produced from tetraethoxysilane, aluminum tri(secondary-butoxide) and boron trimethoxide. These ingredients were all distilled prior to utilization to be of high purity. Additionally nitric acid was employed and sodium hydroxide which were ultra-high purity reagents supplied commercially by EM Laboratories, Inc. The water employed was doubly distilled prior to use.

EXAMPLE

Water (130 grams) and silicon tetraethoxide (600 grams) along with 20 ml of 1N nitric acid were stirred until clear and one phase. An additional quantity of the silicon tetraethoxide (1065 grams) was then added thereby producing a clear solution of a partially hydrolyzed silicon tetraalkoxide. There was then combined with that solution an aluminum alkoxide; in this case 362 grams of aluminum trisecondary-butoxide was added producing a clear solution of the reaction product which may be considered a further hydrolyzable aluminosiloxane. An additional quantity of water (160 ml) was then added to the clear solution for further hydrolysis purposes thereby forming a substantially hydrolyzed aluminosiloxane. Additionally, there was then added 40 ml of 1N nitric acid, 858 grams of trimethylborate and an additional quantity of 850 ml of water. The clear solution was then allowed to gel by standing, thereby producing a gel which includes water, alkanols, and a substantially hydrolyzed metallosiloxane. After standing overnight the gel was concentrated by heating under vacuum, using an oil bath at about 70°C. The concentrating was generally done until the residual concentrate was about 100% overweight based on the theoretical oxide composition. An additional quantity of water (500 ml) was then added to the concentrated gel and fractional distillation effected with a conventional laboratory fractionating column. Distillate was removed until the column-head temperature reached 100°C. which indicates the removal of all residual alkanol and effects the complete hydrolysis residual alkoxy groups. A homogeneous, amorphous, aluminoborosilicate composition was obtained weighing about 1130 grams and showed an iron content of less than 90 parts per billion.

About 1090 grams of the above-produced aluminoborosilicate was mixed with about 712 grams of an ultra-high purity 30% by weight solution of sodium hydroxide. The mixture was then heated under vacuum to produce a hard solid and then was finally dried under vacuum by first heating at a temperature of about 130°C. and then progressively to a temperature of about 200°C. The iron content of this material was about 90 parts per billion and samples thereof with various melting experiments showed no signs of carbonaceous residue. These melting experiments included for example melting in a nitrogen atmosphere and in covered crucibles.

As will be obvious the term fractionally distilling a product or material means that the material or product is heated in a pot under a fractionating column with removal of distillate at the column-head.

I claim:
1. A process for producing a carbon-free homogeneous silicate glass comprising
    a. combining a hydrolyzable metal alkoxide with a clear solution of a partially hydrolyzed silicon tetraalkoxide so as to form a clear solution of a further hydrolyzable metallosiloxane;
    b. adding an additional quantity of water to said solution in an amount in excess of that required to theoretically hydrolyze residual alkoxy groups of said further hydrolyzable metallosiloxane, thereby forming a substantially hydrolyzed metallosiloxane;
    c. fractionally distilling said substantially hydrolyzed metallosiloxane in the presence of free water for a time sufficient to remove all residual alcohol and hydrolyze residual alkoxy groups;
    d. heating the residue of fractional distillation at a temperature and for a time sufficient to form a silicate glass.
2. The process of claim 1 wherein said silicon tetraalkoxide is silicon tethraethoxide.
3. The process of claim 2 wherein said metal alkoxide is aluminum alkoxide.
4. In a process for forming a carbon free silicate glass comprising: forming a hydrolysis reaction product of water, a silicon tetraalkoxide and a metal alkoxide, said reaction product comprising alcohol and hydrolyzable alkoxy groups and heating the product at a temperature and for a time sufficient to form a glass, the improvement comprising fractionally distilling said reaction product in the presence of free water with a fractionating column for a time sufficient to produce a column-head temperature of 100°C to remove all residual alcohol and hydrolyze residual alkoxy groups.

* * * * *